Figure 1:
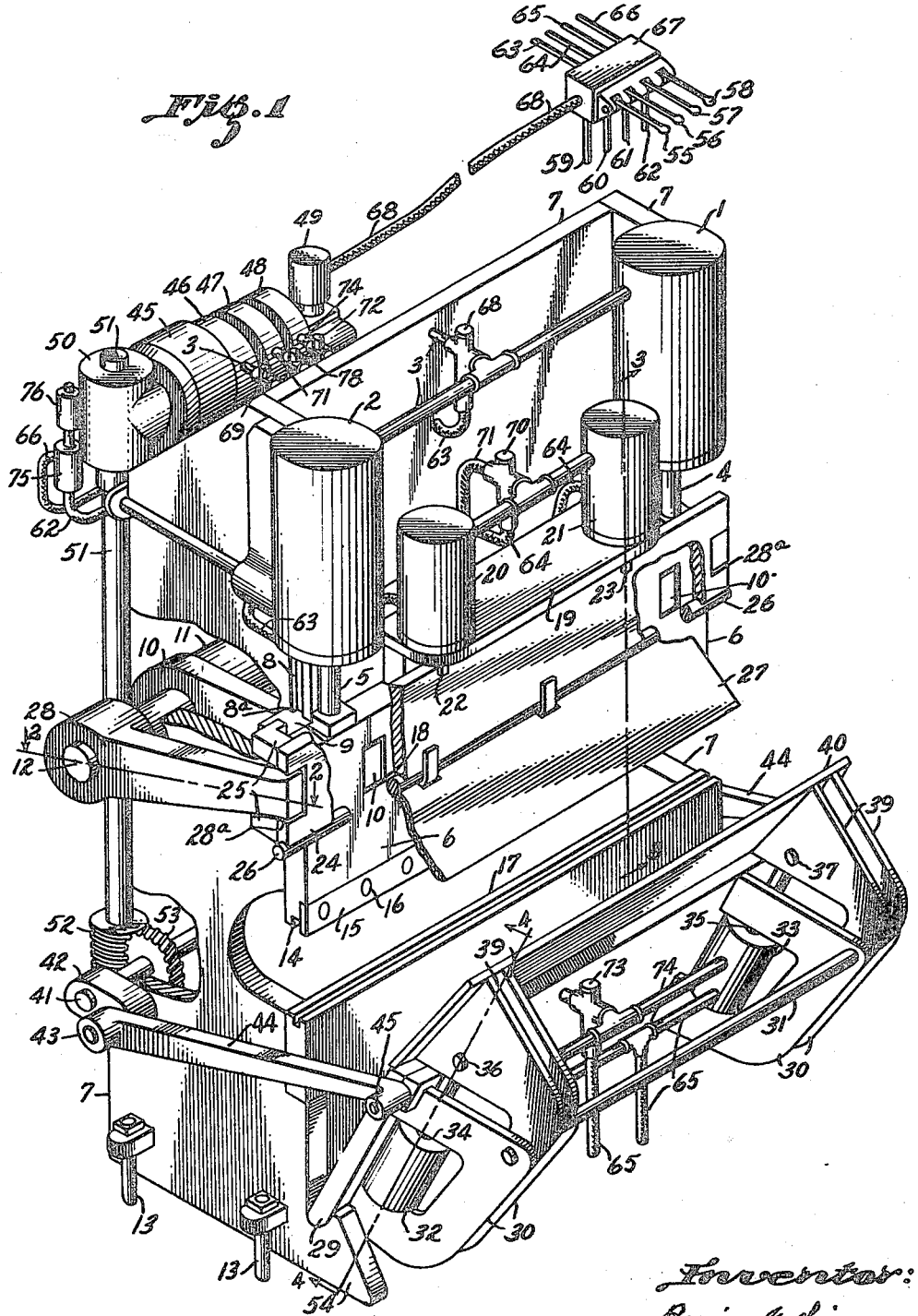

Nov. 11, 1947.  B. G. SIMMONS  2,430,588
POWER PRESS BRAKE WITH BRAKE BEAM EQUALIZER AND WORK HOLDING BENDER
Filed Jan. 10, 1946  2 Sheets-Sheet 1

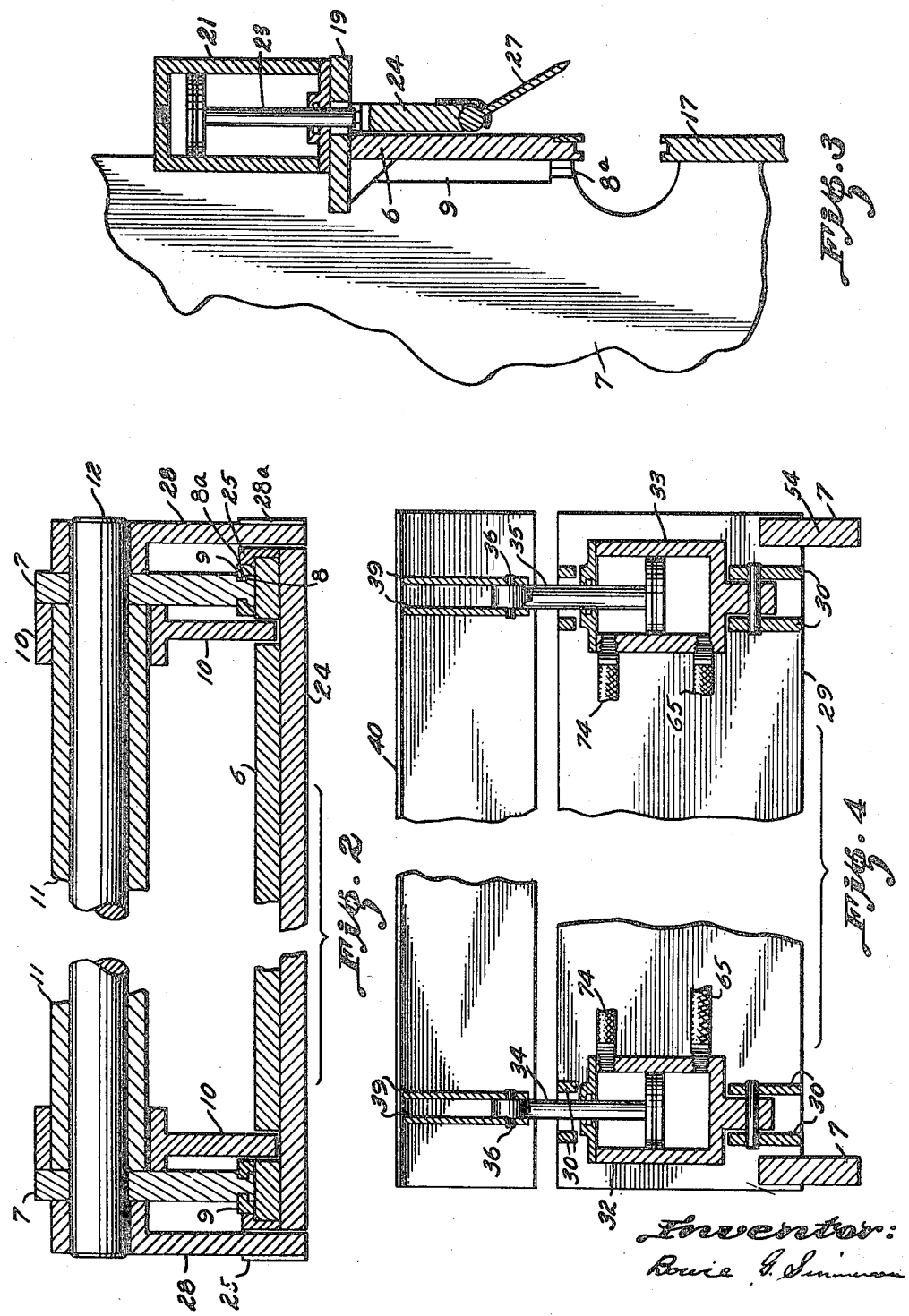

Patented Nov. 11, 1947

2,430,588

UNITED STATES PATENT OFFICE 2,430,588

POWER PRESS BRAKE WITH BRAKE BEAM EQUALIZER AND WORK HOLDING BENDER

Bowie G. Simmons, Mobile, Ala.

Application January 10, 1946, Serial No. 640,349

5 Claims. (Cl. 153—16)

This invention relates to power press brakes, and particularly that class of power press brakes in which press brake beams and clamping vices are suitably mounted in a housing or framework and adapted for mechanical movements by means of hydraulic cylinders and mechanisms in a manner to permit the brake beams and clamping vices to be moved out or down against an anvil, thereby performing a pressing operation when power is applied to the hydraulic cylinders and mechanisms and retracted when opposite pressures and/or operating power is applied to complete a cycle of operation.

The general object of the invention is to provide a mechanism of this kind wherein the brake beams and clamping vices and the several operating cylinders and mechanisms in a framework or housing are suitably mounted, for mechanical operation in such manner that each, any or all brake beams and clamping vices can be operated separately or collectively to clamp, hold, bend or press sheet metal sheets into deformed shapes.

A further object is to provide a very simple means whereby the power of the hydraulic cylinders and operating mechanisms are applied to the brake beams and clamping vices as to secure the separate and collective clamping, stamping, bending and press action, respectively.

Other objects will appear in the course of the following description.

My invention is illustrated in the accompanying drawings, wherein:

Figure 1 is an isometric view of framework, cylinders, brake beams, clamping vices and mechanisms used in my power press brake system and the central operator controls.

Figs. 2, 3 and 4 are detail sectional views taken on lines 2—2, 3—3, and 4—4 respectively, of Fig. 1.

Referring to the drawing it will be seen that I have illustrated, in a cut away view, a framework or housing consisting of three heavy steel plates or steel casting, designated generally 7. These members are preferably mounted on a suitable foundation by means of foundation bolts 13, though they may be mounted in any other suitable manner. Mounted in any suitable manner upon the upper ends of the housings 7, is a motor 45, which is suitably connected in a manner to mechanically drive three hydraulic pumps designated 46, 47 and 48, which pumps are of conventional design. Also, mechanically connected to and driven by the motor 45 is an air compressor pump 49, and a shaft reversing drive 50, whereby the shaft 51 can be rotated in either direction.

This reversing drive is of conventional design wherein two oppositely driven clutches are freely rotated about the neutral axis of the shaft 51, whereby the shaft 51 is quiescent when both clutches are open, and is driven when one clutch is engaged, and driven in a reverse direction when the first named clutch is released and the opposite clutch is engaged.

For the purpose of centralized controls for the widely separated mechanisms of the machine a central operator station is provided. The controls are of pneumatic type wherein compressed air from the air compressor pump 49 is supplied to the portable manifold housing 67 by suitable pipes or hose 68. Mounted on the manifold 67 are four three-way acting valve and control levers, designated, respectively, 55, 56, 57, and 58. The valve levers are neutral when they are in their central position, and alternately active when manipulated by the operator to the upward or downward position.

Mounted on these housing members 7 are two hydraulic cylinders 1 and 2, and passing downwardly from these cylinders are two connecting rods, 4 and 5, respectively, which are securely mounted at their lower ends to the opposite ends of the brake beam 6. The brake beam 6 is provided with a groove 14, in its lower edge, into which groove forming dies are clamped by the face bar 15 and the clamp bolts 16.

Mounted on the lower front face of the housing members 7 and being a part of the framework of the machine is the anvil bar 17. The upper face edge of the bar 17 is grooved, into which groove forming dies are fitted.

Provided near the front edge of the two-side members 7 is a groove 8. Mounted on each end of the brake beam 6 is a guide bar 9. These guide bars are provided with the inwardly extending ears 8a, which ears are adapted for sliding movements in the grooves 8, whereby the beam 6 is guided downwardly to the anvil bar 17 in a parallel line with the front edges of the housings 7, and the cylinders 1 and 2. The brake beam 6 is further provided with two rectangular apertures 18 through the body of this member near its two ends and adjacent the inside edges of the vertical housing members 7. Into these apertures, the snugly fit generally rectangular shaped ends of the equalizing arms 10 rotate on a horizontal axis. Mounted on a longitudinal shaft 12 which is carried by the housing 7 is a hollow shaft 11 and the two outwardly extending equalizer arms 10 which in turn engages with the brake beam 6, whereby both ends of the brake beam 6 is uniformly driven in its downward and retracting strokes. By this means the power applied to the brake beam 6 by the cylinders 1 and 2 is distributed evenly along the beam 6 and thereby providing uniform bending, clamping and/or stamping pressures between the brake beam 6 and the anvil bar 17.

Referring to Figs. 1 and 3, it will be seen that the brake beam 6 has the member 19 securely attached to its upper edge, which member in turn carries the hydraulic cylinders 20 and 21, and passing downwardly from these cylinders are two piston rods 22 and 23, respectively. The lower ends of these piston rods 22 and 23 are connected in a suitable manner to the opposite ends of the brake beam 24. Also, mounted on each end of the brake beam 24 (see Fig. 2) are the rearwardly extending and inwardly projecting guide bars 25, which in turn guide the brake beam 24 vertically along the face side and ends of the brake beam 6 and in a parallel line with the cylinders 20 and 21. Also, pivotally connected to the lower edge of the brake beam 24 is the oscillating brake beam 27, which is adapted to oscillate on the neutral axis of the shaft 26. The brake beam 24 is further provided, with a rectangular slot 28a in each end, for snugly receiving the ends of the outwardly extending equalizer arms 28. Mounted securely on each end of the longitudinal shaft 12, which is carried by the vertical housing members 7, are the two outwardly extending equalizer arms 28, which in turn engages the brake beam 24, whereby the brake beams 24 and 27 are uniformly driven in their downward and retracting strokes. By this means it will be seen that the brake beam 6 carries the before named member 19 and the two hydraulic cylinders 20 and 21, also, the brake beams 24 and 27; that these members, by reason of this arrangement, are driven when operating pressures are applied to the cylinders 1 and 2; that these members 24 and 27 may be operated or may remain quiescent when the brake beam 6 is either quiescent or is driven.

Referring to the drawing, it will be seen that the oscillating anvil bar 29 is pivotally mounted for limited pivotal action on the outwardly projecting ears 54 on the lower front edges of the vertical housing members 7. This anvil bar 29 carries the outwardly projecting and upwardly extending members 30, which members carry the longitudinal pivot shaft 31, and the two hydraulic cylinders 32 and 33. Passing upwardly from these cylinders are the two piston rods 34 and 35, respectively, which in turn are pivotally connected on their upper ends by the pivot pins 36 and 37, respectively, to the clamp bar members designated generally, 39. Pivotally connected and carried by the members 30 and the shaft 31 are the inwardly extending and upwardly projecting members 39, these members in turn carry the clamp bar 40, whereby the clamp bar 40 is driven downwardly against the anvil bar 29 when operating pressures are applied to the cylinders 32 and 33, and retracted when opposite operating pressures are applied to them.

The hydraulic cylinders 1 and 2, the hydraulic pump 46 and the mechanisms described form the means by which the brake beam 6 is driven. When the valve operating lever 55, which is mounted on the portable manifold 67, is shifted downward from its neutral position by the operator, this valve is opened and compressed air from the manifold 67 enters the hose 59, which hose is extended in any suitable manner from the manifold 67 to the hydraulic valve 69 on the hydraulic pump 46. The compressed air in the hose 59, acting upon the valve 69, closes this valve, hydraulic pressure from the pump 46 is then applied to the upper ends of the cylinders 1 and 2, through the check valve 68 and the pipes 3. The hydraulic pressure in the upper end of cylinders 1 and 2, acting upon the piston in the said cylinders, drives the brake beam 6 downwardly against the anvil bar 17, thereby performing a pressing operation. When the valve lever 55 is shifted to the neutral position this valve is opened. The air pressure in the hose 59 is released, whereby the valve 69 on the pump 46 is opened and the pressure in the line 3 between the pump 46 and the check valve 68 is released to stop the downward stroke of the brake beam 6. The check valve 68, remaining closed, holds the beam 6 against the anvil bar 17. When the holding operation is completed, the valve lever 55 is shifted to the upward position, the valve is opened and compressed air from the manifold 67 enters the hose 63, which hose is extended in any suitable manner from the portable manifold 67 to the check valve 68 and the lower ends of the cylinders 1 and 2. The air pressure, acting upon the check valve 68, opens this valve to release the hydraulic pressure in the upper ends of the cylinders 1 and 2. Simultaneously with the opening of the check valve 68 the air pressure in the hose 63, entering the lower ends of the cylinders 1 and 2 and acting upon the piston therein, drives the brake beam 6 upwardly to any desired position. At which time, the valve lever 55 is shifted to the neutral position closing this valve. This valve, remaining closed, holds the air pressure in the lower end of the cylinders 1 and 2, whereby the brake beam 6 is held in this position any desired time. When the valve lever 55 is shifted downwardly from the neutral position, the valve is opened releasing the air pressure in the lower end of the cylinders 1 and 2, whereby the brake beam 6 is lowered. Simultaneously the air pressure from the manifold 67 entering the hose 59 is also acting upon the hydraulic valve 69, closing this valve whereby another cycle of operation has begun. By this means the brake beam 6 is driven downwardly against the anvil bar 17; is held in this position any desired time; is released and retracted any desired height and held any desired time until further operation is desired.

The hydraulic cylinders 20 and 21, the hydraulic pump 47 and the mechanisms described form the means by which the brake beam 24 and the oscillating brake beam 27 are driven. When the valve operating lever 56, which is mounted on the portable manifold 67, is shifted downwardly from its neutral position by the operator, this valve is opened, and compressed air from the manifold 67 enters the hose 60, which hose is extended in any suitable manner from the manifold 67 to the hydraulic valve 78 on the hydraulic pump 47. The compressed air in the hose 60 acting upon the valve 78 closes this valve and hydraulic pressure from the pump 47 is then supplied to the upper end of the cylinders 20 and 21 through the check valve 70 and the pipes 71. The hydraulic pressure in the upper ends of the cylinders 20 and 21, acting upon the pistons in the said cylinders, drives the brake beam 24 downwardly any desired distance. When the desired downward movement of the beam 24 has been reached the valve operating lever 56 is returned to its neutral position by the operator, this valve is opened and the air pressure in the hose 60 is released, whereby the valve 78 on the pump 49 is opened and hydraulic pressure in the pipe 71 is released between the pump 47 and the check valve 70 to stop the downward stroke of the brake beam 24. The check valve 70, remaining closed, holds the brake beam 24 in such position any desired time. When the holding operation is completed, the valve lever 56 is shifted to the upward position. This valve is opened and the compressed air from the manifold 67 enters the hose 64, which hose is extended in any suitable manner from the manifold 67 to the check valve 70 and the lower ends of the cylinders 20 and 21. The air pressure acting upon the check valve 70 opens the valve to release the hydraulic pressure in the upper ends of the cylinders 20 and 21. Simultaneously with the opening of the check valve 70, the air pressure in the hose 64, also, entering the lower ends of the cylinders 20 and 21, and acting upon the pistons therein, drives the brake beam 24 upwardly to any desired position, at which time the valve lever 56 is shifted to the neutral position by the operator closing this valve. This valve, remaining closed, holds the air pressure in the lower ends of the cylinders 20 and 21, whereby the brake beam 24 is held in this position any desired time. When the valve lever 56 is shifted downward from its neutral position by the operator this valve is opened, thereby releasing the air pressure in the lower ends of the cylinders 20 and 21, whereby the brake beam 24 is lowered. Simultaneously with the opening of the valve 56, air pressure from the manifold 67, entering the hose 60, is also acting upon the hydraulic valve 78, closing this valve whereby another cycle of operation has begun. By this means the brake beam 24 is driven downwardly any desired extent; is held in this position any desired time; is retracted any desired distance; and there held any desired time until further operation is desired.

The hydraulic cylinders 32 and 33, the hydraulic pump 48 and the mechanisms described form the means by which the clamp bar 40 is driven. When the valve operating lever 57, which is mounted on the portable manifold 67, is shifted downwardly from its neutral position by the operator this valve is opened, compressed air from the manifold 67 then enters the hose 61, which hose is extended in any suitable manner from the manifold 67 to the hydraulic valve 72 on the hydraulic pump 48. The compressed air in the hose 61, acting upon the valve 72, closes this valve. Hydraulic pressure is then applied to the upper ends of the hydraulic cylinders 32 and 33 through the check valve 73 and the pipe line 74. The hydraulic pressure in the upper ends of the cylinders 32 and 33, acting upon the piston in the said cylinders, drive the clamp bar 40 downward against the oscillating anvil bar 29 to perform a pressing operation. When the desired clamping operation is secured, the operator shifts the valve operating lever 57 to its neutral position, the valve is opened, thereby releasing the air pressure in the hose 61 to open the valve 72, which in turn releases the hydraulic pressure in the pipe line 74 between the pump 48 and the check valve 73. The check valve 73, remaining closed, holds the clamping bar 40 against the anvil bar 29. When the holding operation is completed, the valve lever 57 is shifted to the upward position, the valve is opened and compressed air from the manifold 67 enters the hose 65, which hose is extended in any suitable manner from the portable manifold 67 to the check valve 73 and the lower ends of the cylinders 32 and 33. The air pressure in the hose 65, acting upon the check valve 73, opens this valve to release the hydraulic pressure in the upper ends of the cylinders 32 and 33. Simultaneously with the opening of the check valve 73 the air pressure in the hose 65, also, entering the lower ends of the cylinders 32 and 33 and acting upon the piston therein, the clamp bar 40 is raised to any desired extent, at which time the valve operating lever 57 is shifted to the neutral position by the operator, closing the said valve. This valve, remaining closed, holds the air pressure in the lower ends of the cylinders 32 and 33, whereby the clamp bar 40 is held in this position any desired time. When the valve operating lever 57 is shifted downward from its neutral position by the operator, this valve is opened, thereby releasing the air pressure in the lower ends of the cylinders 32 and 33, whereby the clamp bar 40 is lowered. Simultaneously with the opening of the valve 57, the air pressure from the manifold 67 entering the hose 61 is also acting upon the hydraulic valve 72 to close this valve, whereby another cycle of operation has begun. By this means, the clamping bar 40 is driven downward against the anvil bar 29; is held in this position any desired time; is retracted any desired distance; and there held any desired time until further operation is desired.

The shaft reversing drive 50, the shaft 51, the worm 52, the worm gear 53, the longitudinal shaft 41, and the mechanisms described form the means by which the oscillating anvil bar 29 is driven. Mounted on the lower end of the shaft 51 is the worm 52 which is enmeshed with the worm gear 53. This worm gear is carried by the longitudinal shaft 41 which in turn is suitably mounted on the vertical housing members 7. Also, carried on each end of the shaft 41 are the crank members 42 which in turn carries the outwardly extending crank pins 43. Pivotally connected on their rearward ends and carried on the said crank pins are two connecting rods 44, which extend transversely across the vertical housing members 7, to and are pivotally connected on their forward ends with the outwardly extending shafts 45, which in turn is carried by the oscillating anvil bar 29, whereby the anvil bar 29 is driven inwardly against and outwardly away from the anvil bar 17 by the connecting rods 44 when the shaft 41 is rotated. This shaft 41 is driven when the operating valve lever 58 is shifted downward from its neutral position by the operator. When valve 58 is opened compressed air from the pump 49 is supplied to the lower end of the clutch operating cylinder 75, through the hose 62, which is extended in any suitable manner from the manifold 67 to the lower end of the cylinder 75. The air pressure acting upon the piston in the cylinder 75 drives the piston rod 76 upward which in turn closes the upper reversing clutch on the vertical shaft 51. The shaft 51 in this instance, is rotated clock-wise to drive the shaft 41 in one direction, whereby the oscillating anvil bar 29 is pulled inwardly against the anvil bar 17 to any desired extent. When the valve lever 58 is returned to its neutral position, this valve is opened releasing the air pressure in the lower end of the cylinder 75 to release the clutch and stop the operation. When the valve operating lever 58 is shifted from the neutral position to the upward position, this valve is opened and compressed air is supplied to the upper end of clutch operating cylinder 75 through the hose 66, which is extended in any suitable manner from the valve manifold 67 to the upper end of the clutch operating cylinder 75. The air pressure acting upon the piston in the cylinder 75 drives the piston rod 76 downward which in turn closes the lower reversing clutch on the vertical shaft 51. This shaft 51 is then driven in a reverse or counter-clock-wise manner to drive the shaft 41 in a reverse direction, whereby the anvil bar 29 is driven outwardly from the anvil bar 27, at which time the valve lever 58 is returned to its neutral position by the operator to stop further operation. By this means the oscillating anvil bar 29 is pulled inwardly against the anvil bar 17 to any desired extent; is held quiescent in such position any desired time; is driven outwardly to any desired extent, and held quiescent until further operation is desired.

Referring to the drawing, it will be seen that when a metal sheet is positioned on the anvil bar 17 and the beam 6 is driven downwardly against the bar 17 by pressure in the upper ends of the cylinders 1 and 2, the sheet is deformed to conform to the die inserts used in the bar 17 and the beam 6; that the sheet metal, so deformed, remains clamped between these members until the pressure in the cylinders 1 and 2 is released. The metal sheet may be further deformed when it extends in a horizontal plane, between the anvil bar 29 and the clamp bar 40. When it is desired to further deform the metal sheets, the anvil bar 29 is spaced, according to length of metal needed to make the deformation, from the anvil bar 17 by rotating shaft 41. The clamp bar 40 clamps the metal sheet against the bar 29 when pressure is applied to the upper ends of the cylinders 32 and 33. In this position the metal sheet, already deformed and held clamped between the bar 7 and the beam 6 and also clamped between the bar 29 and 40, is deflected downwardly by the oscillating brake beam 27, which strikes the metal sheet midway between the anvil bars 7 and 29 when pressure is applied to the cylinders 20 and 21. When the metal sheet is deflected downwardly by the beam 27, the clutch, which pulls the beam 29 inwardly, is coincidentally engaged to pull the beam 29 inwardly as the beam 27 is driven downwardly. After the beam 27 has started the downward deflection of the sheet metal to some extent, the beam 27 may be retracted by releasing the pressure in the cylinders 20 and 21 and applying retracting pressure in the lower ends of these cylinders, thereby permitting the oscillating bar 29 to be pulled against the bar by continued rotation of the shaft 41, whereby the metal sheet is deformed between the anvil bars 7 and 29. However, the beam 27 may be used as a die, around which the metal sheet is formed, between the anvil bars 7 and 29 and its lower edge when it is not retracted. By this means it will be seen that my power press brake mechanism provides an effective method to press, stamp, bend and shape metal sheets into deformed shapes.

From the foregoing specifications, it is seen that I have provided a suitable framework or housing for my power press brake, that suitable power operated hydraulic pumps, air compressors and operating mechanisms are provided; that these mechanisms are controlled from a portable central control station; that by proper manipulation of the control levers as described herein, a large variety of clamping, bending, stamping and holding operation are obtained by the several mechanisms; that these mechanisms may be operated separately or collectively to press, stamp, bend and shape sheet metal sheets into deformed shapes.

While I have illustrated a particular form of my invention which I believe to be particularly effective, I do not wish to be limited to the details shown, as it is obvious that many changes might be made therein without departing from the spirit of the invention.

I claim:

1. A power brake press mechanism of the character described comprising a housing or framework, a power brake beam extending laterally between two vertical housing members, means for guiding the said brake beam on the face edges of the said housing members, means for applying power to the said brake beam to drive it downward to an anvil bar, means for retracting said brake beam to its initial position, means for clamping forming dies in the lower face edge of the said brake beam, means for uniformly driving and retracting each end of the said brake beam, an anvil bar extending laterally between the lower front edges of the said vertical housing members, two hydraulic cylinders securely mounted on the upper front edges of the said two vertical housing members, a piston in each of the said cylinders, a piston rod connected to each of the said pistons, and extending downwardly from each of the said cylinders, and connecting to each end of the said brake beam; a securely mounted hollow longitudinal shaft having a transversally extending and outwardly projecting equalizer arm on each end of the said hollow shaft, the said equalizer arms, engaging the said brake beam on their outwardly extended ends, continuous operated power transmitted mechanism associated with the before named hydraulic cylinders, and means for connecting the power transmitting mechanisms to the said hydraulic cylinders or disconnecting them therefrom.

2. A power press brake mechanism of the character described comprising a housing or framework, a power press brake beam extending longitudinally between the two vertical housing members and being guided thereon, and having a longitudinal member securely attached to its upper edge, a second power press beam, means for guiding the said second named brake beam along the face edge and the two ends of the first named brake beam, means for applying power to the second named brake beam to drive the said beam downward any desired extent, means for retracting the said second named brake beam to its initial position, a third brake beam suitably pivoted on its upper edge for longitudinal pivoted action on the lower edge of the second named brake beam, two hydraulic cylinders which are securely mounted on the before named longitudinal member, a piston in each of the said hydraulic cylinders, a piston rod connected to each of the said pistons, and extending downwardly from each of the said cylinders and being connected on their lower ends to the upper edge of the second named brake beam adjacent its two ends, a shaft, carried by the said end vertical housing members, and having a transversely extending and outwardly projecting equalizer arm on each end of the said transverse shaft, the said equalizer arms engaging the second named brake beam on their outwardly extending ends, continuous operated power transmitting mechanism associated with the last named hydraulic cylinders and means for connecting the power transmitting mechanism to the said hydraulic cylinders, or disconnecting them therefrom.

3. A power press brake mechanism of the character described comprising a framework or housing, said housing having outwardly extending ears on their lower front edges, an oscillating anvil bar extending laterally between the said vertical housing members, and carried on the before named ears, two outwardly extending and upwardly projecting angular members securely mounted on each end of the said anvil bar, a longitudinal pivot shaft carried by the said angular members, a longitudinally extending clamp bar, two upwardly extending and inwardly projecting angular members pivoted on their lower outer ends with the said pivot shaft and being carried on their opposite ends by said longitudinally extending clamp bar, two hydraulic cylinders securely mounted on the lower front sides of the first named angular members, a piston in each of said cylinders, a piston rod connected to each of the said pistons and extending upwardly from the said cylinders, the said piston rods being pivotally connected on their upper ends to the second named angular members, means for applying power to the said clamping bar to drive it downward against the said oscillating anvil bar, means for retracting said clamp bar to its initial position, continuous operated power transmitting mechanisms associated with the said hydraulic cylinders, and means for connecting the power transmitted mechanisms to the cylinders or disconnecting them therefrom.

4. A power press brake mechanism of the character described comprising a framework or housing, two continuously driven oppositely rotated power transmitting clutches loosely mounted on a vertical shaft, said vertical shaft being carried by the said housing members, a worm securely carried on the lower end of said shaft and being enmeshed with a worm gear, said worm gear being securely mounted on a longitudinal shaft, said longitudinal shaft being mounted in the said housing members, a crank member with outwardly extending crank pin securely mounted on each end of the said longitudinal shaft, two connecting rods pivotally mounted on their rearward ends on the said crank pins, said connecting rods extending transversely across the housing members and being pivotally mounted on their forward ends on two outwardly extending shafts, said shafts being carried by an anvil bar, continuous operative power transmitting mechanisms associated with the before named oppositely driven clutches, means for alternately engaging or disengaging the said power transmitting clutches to the transmitting mechanisms or disconnecting them therefrom.

5. In a power press mechanism, comprising a housing or framework, a longitudinal brake beam operatively connected and uniformly driven downwardly against an anvil bar and retracted upwardly along the face edges of the said vertical housings, a longitudinally extending anvil bar securely carried on its ends by the said vertical housing members and being interposed immediately below the said brake beam, a second longitudinal brake beam operatively connected and uniformly driven downwardly any desired extent and retracted upwardly along the face edge and ends of the first named brake beam, a third longitudinal brake beam operatively connected for pivotal action on its upper edge with the lower edge of the second named beam, a longitudinally extending oscillating anvil bar being pivotally mounted on its lower edges for pivotal action in the lower face edges of the said vertical housings, a longitudinally extending clamp bar operatively connected and driven downwardly against the said oscillating anvil bar and retracted upwardly away from the said anvil bar, two oppositely rotated power transmitting clutches loosely mounted on a vertical shaft, a worm thereon engaging a worm gear, a longitudinal shaft having the said worm gear thereon, a crank member and an outwardly extending crank pin on each end of the said shaft, two connecting rods pivotally connected on their rearward ends to the said crank pins and pivotally connected on their opposite ends to the said oscillating anvil bar.

BOWIE G. SIMMONS.

REFERENCES CITED

The following references are of record in the file of this patent:

UNITED STATES PATENTS

| Number | Name | Date |
| --- | --- | --- |
| 2,221 | Houpt | Aug. 21, 1841 |
| 1,258,892 | Griffin | Mar. 12, 1918 |
| 1,469,689 | Prus | Oct. 2, 1933 |
| 1,558,074 | Bried | Oct. 20, 1925 |
| 1,935,173 | Anthony et al. | Nov. 14, 1933 |
| 1,976,106 | Archea | Oct. 9, 1934 |
| 1,985,385 | Sjolander | Dec. 25, 1934 |
| 2,117,852 | Pearmain | May 17, 1938 |
| 2,169,113 | Sheppard | Aug. 8, 1939 |
| 2,217,172 | Laussucg | Oct. 8, 1940 |
| 2,343,441 | Babcock et al. | Mar. 7, 1944 |

FOREIGN PATENTS

| Number | Country | Date |
| --- | --- | --- |
| 12,274 | Great Britain | Sept. 28, 1886 |